US008713078B2

(12) United States Patent
Kunjithapatham et al.

(10) Patent No.: US 8,713,078 B2
(45) Date of Patent: Apr. 29, 2014

(54) METHOD FOR BUILDING TAXONOMY OF TOPICS AND CATEGORIZING VIDEOS

(75) Inventors: Anugeetha Kunjithapatham, Santa Clara, CA (US); Priyang Rathod, Mountain View, CA (US); Simon Gibbs, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 159 days.

(21) Appl. No.: 12/541,157

(22) Filed: Aug. 13, 2009

(65) Prior Publication Data
US 2011/0040767 A1 Feb. 17, 2011

(51) Int. Cl.
G06F 12/00 (2006.01)
G06F 17/30 (2006.01)

(52) U.S. Cl.
USPC .......................................... 707/829; 707/778

(58) Field of Classification Search
USPC .......................................... 707/738, 778, 829
See application file for complete search history.

(56) References Cited

U.S. PATENT DOCUMENTS

| | | | |
|---|---|---|---|
| 6,212,494 B1 | 4/2001 | Boguraev | |
| 6,311,194 B1 | 10/2001 | Sheth et al. | |
| 6,363,380 B1 | 3/2002 | Dimitrova | |
| 6,505,194 B1 | 1/2003 | Nikolovska et al. | |
| 7,257,574 B2 | 8/2007 | Parikh | |
| 7,302,646 B2 | 11/2007 | Nomiyama et al. | |
| 7,580,921 B2 | 8/2009 | Patterson | |
| 7,765,212 B2 | 7/2010 | Surendran et al. | |
| 7,769,761 B2 | 8/2010 | Yoshimura | |
| 8,115,869 B2 | 2/2012 | Rathod et al. | |
| 8,145,648 B2 | 3/2012 | Kunjithapatham et al. | |
| 2002/0087979 A1* | 7/2002 | Dudkiewicz et al. | 725/34 |
| 2004/0060063 A1* | 3/2004 | Russ et al. | 725/46 |
| 2007/0043742 A1* | 2/2007 | Arguello et al. | 707/100 |
| 2007/0143266 A1* | 6/2007 | Tang et al. | 707/3 |
| 2007/0288433 A1* | 12/2007 | Gupta et al. | 707/3 |
| 2008/0046406 A1* | 2/2008 | Seide et al. | 707/3 |
| 2008/0065659 A1* | 3/2008 | Watanabe et al. | 707/100 |
| 2009/0076887 A1* | 3/2009 | Spivack et al. | 705/10 |

OTHER PUBLICATIONS

Google Base, "Post it on Base. Find it on Google", Downloaded on Mar. 17, 2009, http://base.google.com/base/?gsessionid=-R9Htt7s9M, 1 page, Google, Inc., USA.
Delicious, "Delicioussocial bookmarking", Downloaded on Mar. 17, 2009, http://delicious.com/, 6 pages, Delicious.com, USA.
Flickr, "Share your photos. Watch the world", Downloaded on Mar. 17, 2009, http://www.flickr.com/, 1 page, Flickr.com, USA.

(Continued)

*Primary Examiner* — Hosain Alam
*Assistant Examiner* — Van Oberly
(74) *Attorney, Agent, or Firm* — Kenneth L. Sherman, Esq.; Michael Zarrabian, Esq.; Sherman & Zarrabian LLP

(57) ABSTRACT

A computer-implemented method for managing video contents includes collecting a plurality of keywords related to a topic, the keywords being collected using at least one dynamic data source. One or more sub-topics of the topic are identified using the keywords collected. A topic node in a taxonomy of topics is built, the topic node including a topic identifier for the topic, a child topic identifier for the sub-topics identified, and a keyword section for one or more of the keywords collected. A plurality of videos is organized using the topic node built to assist a user in locating a video of interest.

37 Claims, 8 Drawing Sheets

(56) References Cited

OTHER PUBLICATIONS

Youtube, "You Tube", Downloaded on Mar. 17, 2009, http://www.youtube.com/, 2 pages, YouTube.com, USA.
Faviki, "What is Faviki?", Downloaded on Mar. 17, 2009, http://www.faviki.com/pages/welcome/, 1 page, Faviki.com, USA.
Twine, "A smarter way to track interests", Downloaded on Mar. 17, 2009, http://www.twine.com/, 1 page, Twine.com, USA.
Zigtag, "With Zigtag you can . . . ", Downloaded on Mar. 17, 2009, http://www.zigtag.com/, 2 pages, Zigtag.com, USA.
Chuang, S.L. et al., "A Practical Web-based Approach to Generating Top Hierarchy for Text Segments", Proceedings of the 2004 CIKM Conference, Nov. 8-13, 2004, pp. 127-136, ACM, United States.
Bloehdorn, S. et al., "Learning Ontologies to Improve Text Clustering and Classification", Springer.com, 2006, pp. 334-341, Springer Berlin Heidelberg, Germany.
Lin, W.H. et al, "News Video Classification Using SVM-based Multimodal Classifiers and Combinatin Srategies", Proceedings of the 2002 International Conference on Mulitmedia(SIGMM), Dec. 1-6, 2002, pp. 323-326, ACM, United States.
Wang J. et al., "TV Ad Video Categorization with Probabilistic Latent Concept Learning", Proceedings of the 2007 International Workshop on multimedia information retrieval (MIR'07), Sep. 28-29, 2007, pp. 217-226, ACM, United States.
Yang, L. et al.,"Multi-Modlity Web Video Categorization" Proceedings of the 2007 International Workshop on multimedia information retrieval (MIR'07), Sep. 28-29, 2007, pp. 265-274, ACM, United States.
Wikipedia, "Latent Semantic Analysis", Downloaded on Feb. 8, 2013, http://en.wikipedia.org/wiki/Latent_semantic_analysis, pp. 1-6, Wikipedia, United States.
Candan, K.S. et al.,"Creating Tag Hierarchies for Effective Navigation in Social Media", Proceedings of the 2008 workshop on Search in social media (SSM '08), pp. 75-82, ACM, United States.
Recommind, "EERE Division of the U.S. Department of Energy (DOE) Selects MindServer Categorization and MindServer Search for Recommind" Jul. 20, 2010, Recommind, Press Release downloaded Feb. 8, 2013, p. 1, United States.
U.S. Non-Final Office Action for U.S. Appl. No. 12/340,277 mailed Jul. 5, 2011.
U.S. Notice of Allowance for U.S. Appl. No. 12/340,277 mailed Jan. 19, 2012.

\* cited by examiner

METHOD FOR BUILDING TAXONOMY OF TOPICS AND CATEGORIZING VIDEOS

CROSS-REFERENCES TO RELATED APPLICATIONS

NOT APPLICABLE

BACKGROUND OF THE INVENTION

The present invention relates generally to methods for managing videos, and more particularly to methods for building a taxonomy of topics and categorizing videos based on a taxonomy of topics.

Videos, in varied forms, e.g., TV programs and movies, continue to be a popular method to provide and obtain information and entertainment. This is evident in the continual increase in the number of professional and home videos produced every year. For example, historical archives of TV program metadata from Tribune Media Services (TMS) indicate that there has been a hundred-fold increase in the number of programs broadcast over the last 50 years: roughly about 1000 programs were broadcast 50 years back, while almost 100,000 programs were broadcast in 2007. Even a larger volume of videos is provided over the Internet as users create and share their videos through online sites, such as, YouTube, Flickr, and others.

This explosive growth of videos has occurred without much structure or organization. As a result, a significant amount of content, relevant and useful to users, goes unnoticed. Coming up with one big static directory of topics to organize such content is not an easy task since the topics of the content could vary widely. Moreover, the relevancy of concepts or sub-topics related to a topic may change over time. For example, in the topic of basketball, Michael Jordan probably is not as an important sub-topic as it once was when he played for the Chicago Bulls in early 1990's. In addition to the dynamic nature of the concept's relevancy to a topic, different users typically have different preferences and may prefer to organize video contents differently.

In light of the above, there is a need for techniques for building a taxonomy of topics and categorizing videos based on the taxonomy of topics. It is further desirable that the taxonomy of topics be personalized to each user for increased relevancy and be built automatically at certain intervals using dynamic sources, e.g., Web sources, to maintain its relevancy over time.

BRIEF SUMMARY OF THE INVENTION

The present invention provides methods and system for managing video contents. A taxonomy of topics is built using keywords extracted from dynamic data sources, e.g., web sources. Videos are categorized and ranked based on the taxonomy of topics and sub-topics using a hierarchical relationship defined in the taxonomy built.

In one embodiment, a computer-implemented method for managing video contents includes collecting a plurality of keywords related to a first topic, the keywords being collected using at least one dynamic data source. One or more sub-topics of the first topic are identified using the keywords collected. A topic node in a taxonomy of topics is built, the topic node including a topic identifier for the first topic, a child topic identifier for the sub-topics identified, and a keyword section for one or more of the keywords collected. A plurality of videos is organized using the topic node built to assist a user in locating a video of interest.

In one embodiment, the computer-implemented method further includes selecting one of the sub-topics identified and collecting a plurality of keywords related to the sub-topic selected, the keywords being collected using at least one dynamic data source. One or more sub-topics of the sub-topic selected are identified using the keywords collected. A sub-topic node in the taxonomy of topics is built, the sub-topic node including a sub-topic identifier for the sub-topic selected, a child node identifier for the sub-topic of the sub-topic selected, and a keyword section for one or more of the keywords collected for the sub-topic selected. The collecting, identifying, and building steps are repeated to build a taxonomy of topics having a plurality of nodes in a hierarchical structure.

In another embodiment, the computer-implemented method further includes retrieving keywords associated with a second topic and ranks assigned to the keywords from the taxonomy of topics; identifying a plurality of videos associated with each keyword associated with the second topic; and calculating a video-keyword rank for each video associated with each keyword based on a relevancy of the video to the keyword. The relevancy is determined based on one or more of the following factors: (i) the rank of the keyword, and (ii) the total number of times the keyword appears in the metadata of the video.

In another embodiment, the computer-implemented method further includes calculating a video-topic rank by summing the video-keyword ranks calculated for each video that match at least one of the keywords of the second topic. A weighted value of video-parent-topic ranks is added to the video-topic rank, the video-parent-topic rank being weighted based on the proximity of a parent topic to the second topic.

In another embodiment, a computer-readable medium containing instructions for controlling a computer system to manage video contents, the computer-readable medium including code for collecting a plurality of keywords related to a topic, the keywords being collected using at least one dynamic data source; code for identifying one or more sub-topics of the topic using the keywords collected; code for building a topic node in a taxonomy of topics, the topic node including a topic identifier for the topic, a child topic identifier for the sub-topics identified, and a keyword section for one or more of the keywords collected; and code for organizing a plurality of videos using the topic node built to assist a user in locating a video of interest.

In yet another embodiment, a computer system for managing video contents includes a processor configured to process information; a storage subsystem configured to store information; means for collecting a plurality of keywords related to a topic, the keywords being collected using at least one dynamic data source; means for identifying one or more sub-topics of the topic using the keywords collected; means for building a topic node in a taxonomy of topics, the topic node including a topic identifier for the topic, a child topic identifier for the sub-topics identified, and a keyword section for one or more of the keywords collected; and means for organizing a plurality of videos using the topic node built to assist a user in locating a video of interest.

A further understanding of the nature and advantages of the present invention may be realized by reference to the remaining portions of the specification and the attached drawings.

DETAILED DESCRIPTION OF THE INVENTION

The present invention relates to managing video contents that may be stored locally or remotely in a storage server, or both. A taxonomy of topics is built using keywords extracted from dynamic data sources, e.g., web sources. The taxonomy has a hierarchical structure having topics, sub-topics, and keywords. The taxonomy is preferably built automatically or semi-automatically with minimal user intervention and personalized based on the user's past viewing history. Videos are categorized and ranked based on the taxonomy built for each topic and each sub-topic. Hierarchical relationship between a topic and sub-topics is used to rank videos related to a particular topic. Degree of relevance between a video and a topic is identified based on the type of video metadata in which the keyword is found and the rank of the specific keyword that match the videos.

Figures 1, 4:
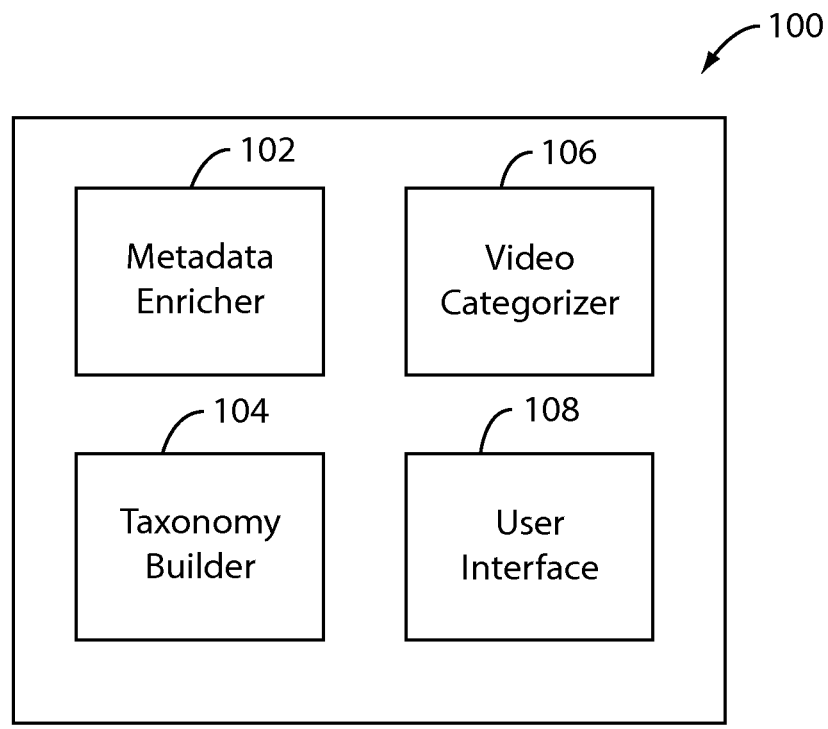
FIG. 1 is a simplified block diagram of a video management system according to an embodiment of the present invention.
FIG. 4 illustrates a block diagram of an exemplary format of a topic node according to an embodiment of the present invention.

FIG. 1 shows a simplified block diagram of a video management system 100 according an embodiment of the present invention. Video management system 100 includes a metadata enricher module 102, a taxonomy building module 104, a video categorizer module 106, and a user interface module 108. Metadata enricher module 102 creates semantic tags and semantically-enriched video metadata to enable efficient search of relevant videos. Taxonomy builder module 104 builds a taxonomy of topics, each topic being associated with a plurality of sub-topics, as explained later using FIGS. 3-5. Video categorizer module 106 maps videos to the topics and sub-topics built by taxonomy builder module 104, as explained below using FIG. 6. Video categorizer module 106 may be used with other types of video taxonomy and is not necessarily dependent on the taxonomy built by taxonomy builder module 104. User interface module 108 assists the user to search, select and view desired videos, as explained below using FIGS. 7-9. As will be understood by one skilled in art, the modules of video management system 100 may be implemented entirely as software modules, or a hardware module, or a combination thereof.

Figure 2:
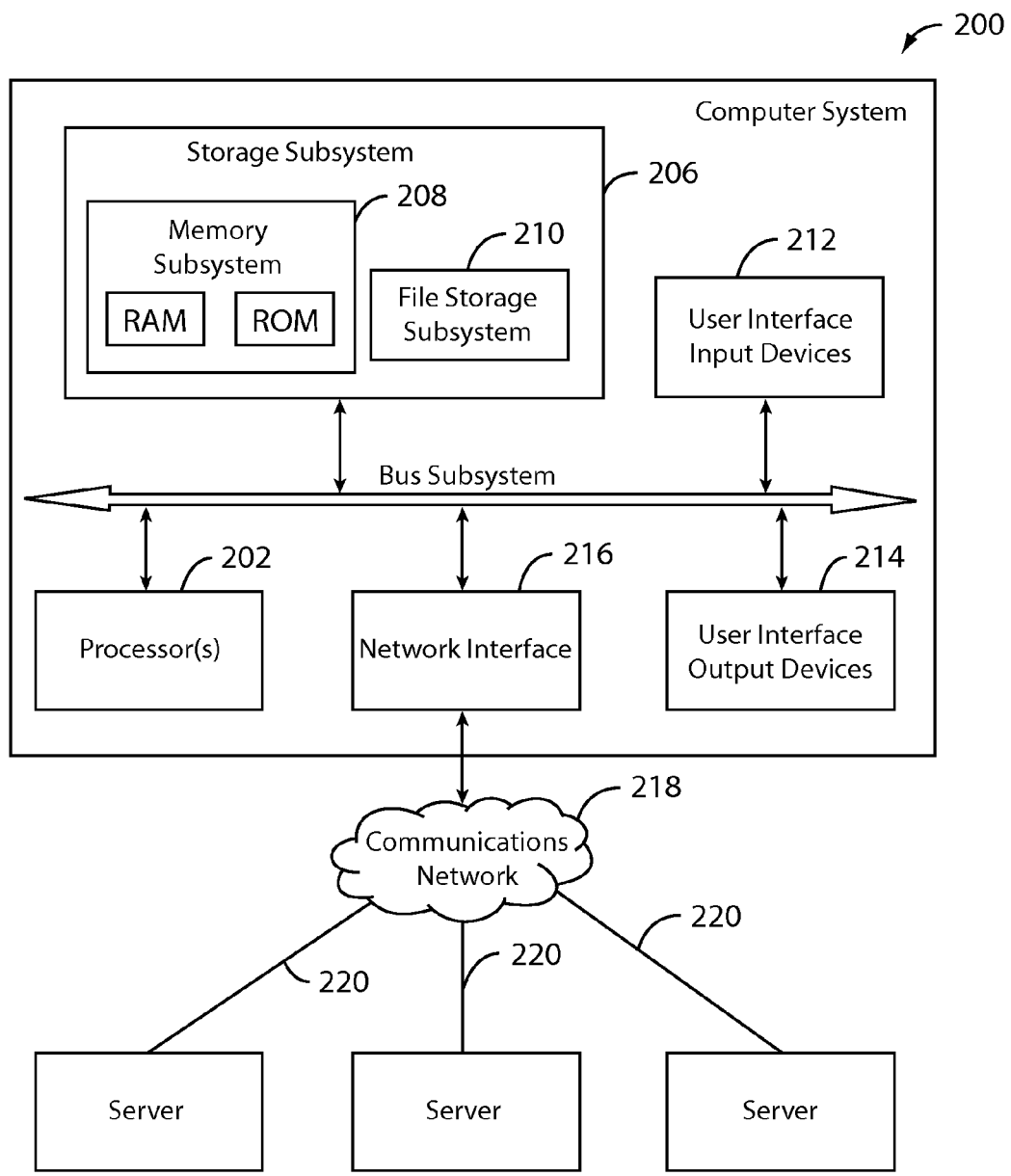
FIG. 2 is a simplified block diagram of a computer system which may incorporate an embodiment of the present invention.

FIG. 2 is a simplified block diagram of a computer system 200 which may incorporate an embodiment of the present invention. Computer system 200 may be a set-top box, a television, a conventional computer, or other systems having capability to store and process information. Computer system 200 typically includes at least one processor 202, which communicates with a number of peripheral devices via a bus subsystem 204. These peripheral devices typically include a storage subsystem 206, user interface input devices 212, user interface output devices 214, and a network interface subsystem 216. Storage subsystem 206 includes a memory subsystem 208 and a file storage subsystem 210.

Input and output devices 212 and 214 allow user interaction with computer system 200. The user may be a human user, a device, a process, another computer, and the like. Network interface subsystem 216 provides an interface to outside networks, including an interface to communications network 218 that links a plurality of computer systems to each other. Network interface subsystem 216 may include, for example, a modem, an Integrated Digital Services Network (ISDN) device, an Asynchronous Transfer Mode (ATM) device, a Direct Subscriber Line (DSL) device, a fiber optic device, an Ethernet card, a cable TV device, or a wireless device.

User interface input devices 212 may include a remote control, a keyboard, pointing devices such as a mouse, trackball, touchpad, or graphics tablet, a scanner, a barcode scanner for scanning article barcodes, a touchscreen incorporated into the display, audio input devices such as voice recognition systems, microphones, and other types of input devices. In general, use of the term "input device" is intended to include all possible types of devices and ways to input information into computer system 200 or onto communications network 218.

User interface output devices 214 may include a display subsystem, a printer, a fax machine, or non-visual displays such as audio output devices. The display subsystem may be a flat-panel device such as a liquid crystal display (LCD), a cathode ray tube (CRT), or a projection device. The display subsystem may also provide non-visual display such as via audio output devices. In general, use of the term "output device" is intended to include all possible types of devices and ways to output information from computer system 200 to a user or to another machine or computer system.

Storage subsystem 206 stores the basic programming and data constructs that provide the functionality of the computer system. For example, the various program modules (e.g., metadata enricher 102, taxonomy builder 104, video categorizer 106, and user interface 108), and databases implementing the functionality of the present invention may be stored in storage subsystem 206. These software modules are generally executed by processor(s) 204. In a distributed environment, the software modules may be stored on a plurality of computer systems and executed by processors of the plurality of computer systems. Storage subsystem 206 also provides a repository for storing the various databases storing information according to the present invention.

In the storage subsystem, memory subsystem 208 typically includes a number of memories including a main random access memory (RAM) for storage of instructions and data during program execution and a read only memory (ROM) in which fixed instructions are stored. File storage subsystem 210 provides persistent (non-volatile) storage for program and data files, and may include a hard disk drive, a solid state drive, a Compact Digital Read Only Memory (CD-ROM) drive, an optical drive, removable media cartridges, and other like storage media. One or more of the drives may be located at remote locations on other connected computers at another site on communications network 218.

Bus subsystem 204 provides a mechanism for letting the various components and subsystems of computer system 200 communicate with each other. The various subsystems and components of computer system 200 need not be at the same physical location but may be distributed at various locations within a distributed network. Although bus subsystem 204 is shown schematically as a single bus, the bus subsystem may include a plurality of buses.

Computer system 200 can be of varying types including a television set, a set-top box, a personal computer, a portable computer, a workstation, a computer terminal, a network computer, a mainframe, or any other data processing system. Due to the ever-changing nature of computers and networks, the description of computer system 200 depicted in FIG. 2 is intended only as a specific example for purposes of illustrating a representative configuration. Many other configurations of a computer system are possible having more or fewer components than the computer system depicted in FIG. 2.

Communications network 218 provides a mechanism for allowing various remote components to communicate and exchange information with each other. Communications network 218 may itself comprise many interconnected computer systems and communication links 220. Communication links 220 may be hardwire links, optical links, satellite or other wireless communication links, wave propagation links, or any other mechanisms for communication of information. Communications network 218 is the Internet in one embodiment of the present invention. Communications network 218, however, may be any suitable computer network.

A plurality of servers 220 is linked to computer system 200 via communication network 218. In one embodiment, servers 220 provide dynamic data to the video management system to build a taxonomy and categorize videos. For example, servers 220 may be those hosted by Google, Yahoo!, Freebase, etc., from where keywords for a topic or sub-topic are extracted, or may be those hosted by YouTube, NetFlix, etc., from where videos are obtained. Servers 220 refer to any system that provides or is capable of providing services or information to computer system 200. The servers may be software-based, hard-ware based, or a combination thereof.

Figure 3:
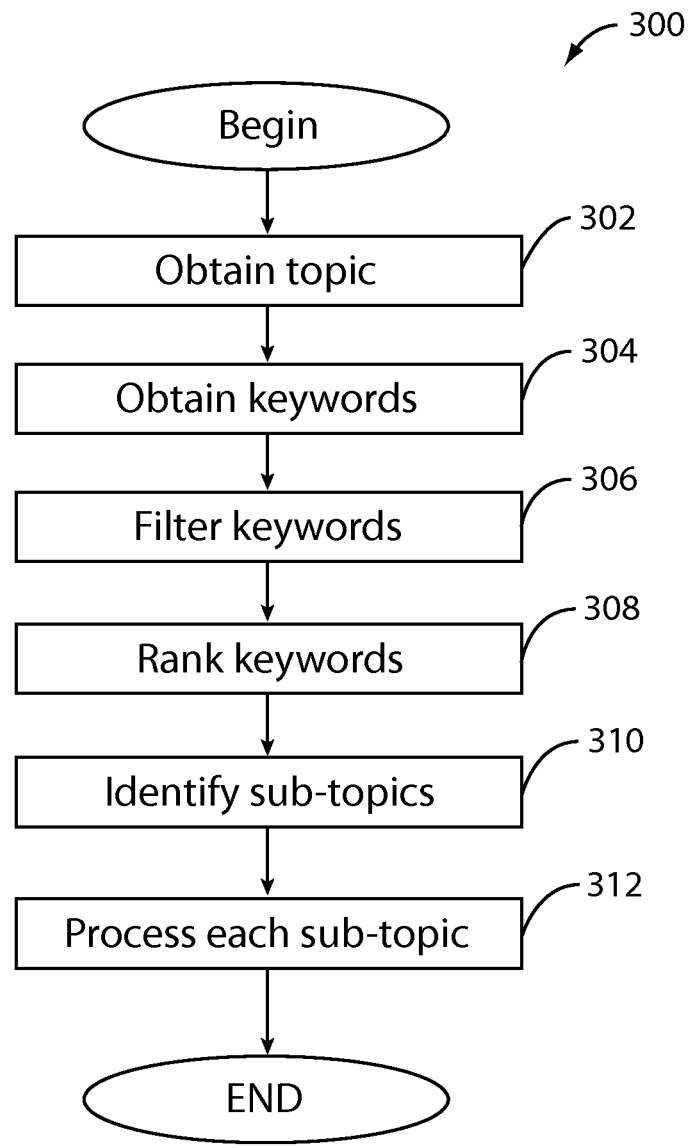
FIG. 3 is a simplified flowchart showing a method of building a taxonomy of topics according to an embodiment of the present invention.

FIG. 3 shows a process 300 for building a taxonomy of topics performed by taxonomy builder module 104 according to an embodiment of the present invention. Taxonomy builder module 104 may be software, firmware, or other logic components performing the process 300. As will be understood by one skilled in art, certain steps described below need not be performed in the same order as described, or may be performed concurrently, or may be omitted depending on implementation.

In one embodiment, process 300 uses the semantic tags and the enriched video metadata created by metadata enricher module 102. A method and system for creating and storing semantic metadata for videos in computing systems is disclosed in application Ser. No. 12/340,277, filed on Dec. 19, 2008, entitled, "Semantic Metadata Creation for Videos," and is incorporated by reference for all purposes. In other embodiments, process 300 is implemented only using conventionally available video metadata and is operated independent of metadata enricher module 102.

Referring back to FIG. 3, taxonomy builder module 104 obtains "history" as a topic (step 302). This topic may be input by a user or selected from a plurality of seed topics preinstalled in taxonomy builder module 104. "History" serves as a root topic node.

At step 304, keywords related to "history" are identified and extracted from dynamic data sources, e.g., Web sources. The keywords include concepts, locations, and names of people that are related to the topic. Dynamic data sources are used to obtain the keywords since the concepts and people's perspective on a topic changes over time. Keywords obtained from dynamic data sources would maximize their relevancy to the topic. Keywords obtained from static data sources would only represent their relevancy at the time the static data source was created. They would be a snapshot and would not accurately reflect the events occurred thereafter or the changes in the people's interests. For example, "George W. Bush" likely would have been at the top of the keywords for the topic "president" for the past several years. With the presidential transition in January 2009, however, "Barak Obama" would likely be at the top if the same search is conducted now.

Web sources are commonly available dynamic data sources at this time. Examples of web sources include Wikipedia, Google Directory, Yahoo Directory, Mozilla Directory, WordNet, Dictionary.com, Freebase and, Ask, Yahoo search engine and Google search engine. These web sources are continuously updated with fresh information to stay on top of the changing world events and the changing people's interests (or preferences). A web source that fails to provide current information quickly becomes irrelevant in the dynamic arena of the Internet world. Although the web sources are likely to be the preferred dynamic data sources for the foreseeable future, other types of dynamic data sources may be used to extract the keywords.

In one embodiment, a plurality of web sources are used to extract the keywords related to a topic in order to obtain more a balanced result. The keywords from web sources are extracted by using the website's API or a web scraper. Some sites provide the keywords directly while others provide a textual description, in which case the keywords are extracted using natural language processing techniques.

In one embodiment, in addition to one or more web sources, a personalized data source (or database) is used to identify and collect the keywords. A personalized data source may be deemed to be a dynamic data source if the former is updated sufficiently regularly, e.g., more than once a year. An example of the personalized data source is a database storing the user preferences or viewing history. Computer system 200 may be used to gather and keep metadata of videos viewed by the user in the storage subsystem 206. If computer system 200 is a set-top box, the personalized data source would be based largely on television shows and movies viewed by the user on a television set. If computer system 200 is a personal computer, the personalized data source would be based largely on the videos seen or downloaded over the Internet and the search queries or websites visited by the user. Of course, these two types of personalized data sources may be combined and stored together in a single database for easier manageability. As understood by one skilled in art, the distinction between the television, the set-top box, and the personal computer is becoming less and less every year as the technologies converge.

In one implementation, at least three dynamic data sources are used to extract the keywords for a more balanced result. In another implementation at least five dynamic data sources are used. In yet another implementation, one or more dynamic sources may be used in conjunction with a static data source that is not updated with sufficient regularity. In yet another implementation, the user is allowed to select the data sources to use in collecting the keywords.

A list of keywords is obtained by performing step 304. Examples of the keywords obtained for the topic "history" are "war, society, politics, economy, religion, etc." Typically the list of keywords obtained would be long and would likely contain irrelevant keywords.

At step 306, the keywords obtained are filtered to remove irrelevant or less important keywords (or noise) from the keyword list. One method of filtering the keywords is to remove a keyword that occurs only at one data source since this is more likely to be noise. Alternatively, a keyword may be removed if it occurs only at two sources. The threshold number of sources would depend on the number of data sources used to obtain the keywords at step 304.

At step 308, a rank is assigned to each keyword remaining after the filtering has been performed. In one embodiment, the rank of a keyword is based on the following factors: (1) the number of sources the keyword appears in, (2) the number of times the keyword appears in each source, and (3) the reliability of the source where the keyword appears. For example, WordNet and Dictionary.com may be deemed more reliable than other sources, and consequently the keywords that appear in these two sources may be ranked higher than the keywords appearing other sources. In one embodiment, the keyword is given a higher rank if it appears in the metadata of the contents watched by the user, i.e., obtained from the personalized data source. A higher rank still may be given if the keyword appears in both the personalized data source and at least one of the web sources.

In one embodiment, the ranking of the keywords is personalized even more by allowing the user to control the weight given to the keywords appearing in the personalized data source. The user is allowed to adjust the weight given to the keywords appearing in the personalized data source by setting the level of personalization (e.g., low, medium, or high): the higher the personalization level, the greater the weight given to the keyword appearing in the personalized data source.

After ranking each keyword, all keywords with a rank lower than a predetermined threshold value are removed. The keywords, thus obtained, along with their respective ranks are stored in a database, e.g., the TaxonomyDB, in storage subsystem 206. Alternatively, the database may be stored at a remote server that is connected to computer system 200 via communication network 218. The keywords are sorted in the TaxonomyDB according to their rank in one implementation. For example, the keywords "war, society, politics, economy, religions, etc." are sorted according to their ranks assigned at step 308 in the TaxonomyDB.

At step 310, sub-topics are identified from the keywords ranked at step 308. In one embodiment, a predetermined number of keywords are selected to be the sub-topics or child nodes of the topic. The top four highest ranked keywords are selected as the sub-topics. In another embodiment, the top five highest ranked keywords are selected as the sub-topics. This predetermined number may be adjusted by the user or taxonomy builder module 104 according to implementation. In the illustrated example, the four highest ranked keywords are "war, society, politics, and economy" and are selected as sub-topics of "history."

As a result of steps 302-310, a topic node in a taxonomy of topics is created. The topic node is stored in the TaxonomyDB and may be represented by the tuple: Node N <name, children, keywords>, where "name" is the topic that the node represents, "children" is the list of child nodes (or sub-topics) of the topic, and "keywords" is a set of keywords remaining after step 308. FIG. 4 illustrates a block diagram of a topic node 400 created. Topic node 400 includes a topic identifier 402 for the topic name (or "history"), a children section 404 for the child nodes of the topic (or "war, society, politics, and economy"), and a keyword section 406 for the keywords (or "war, society, politics, economy, religion, etc.").

At step 312, each sub-topic is processed to create a sub-topic node in the taxonomy by repeating steps 302-310. For example, "war" is provided with its child nodes "$19^{th}$ century, $20^{th}$ century, and $21^{st}$ century." Each of these keywords is processed to create grandchild nodes, and so on until the "sub-topic" processed does not have more two keywords that survives step 308. In one embodiment, the search query for this process includes both the topic and the sub-topic to minimize retrieval of unrelated keywords; e.g., the search query used would be "war $19^{th}$ century" rather than "$19^{th}$ century."

Figure 5:
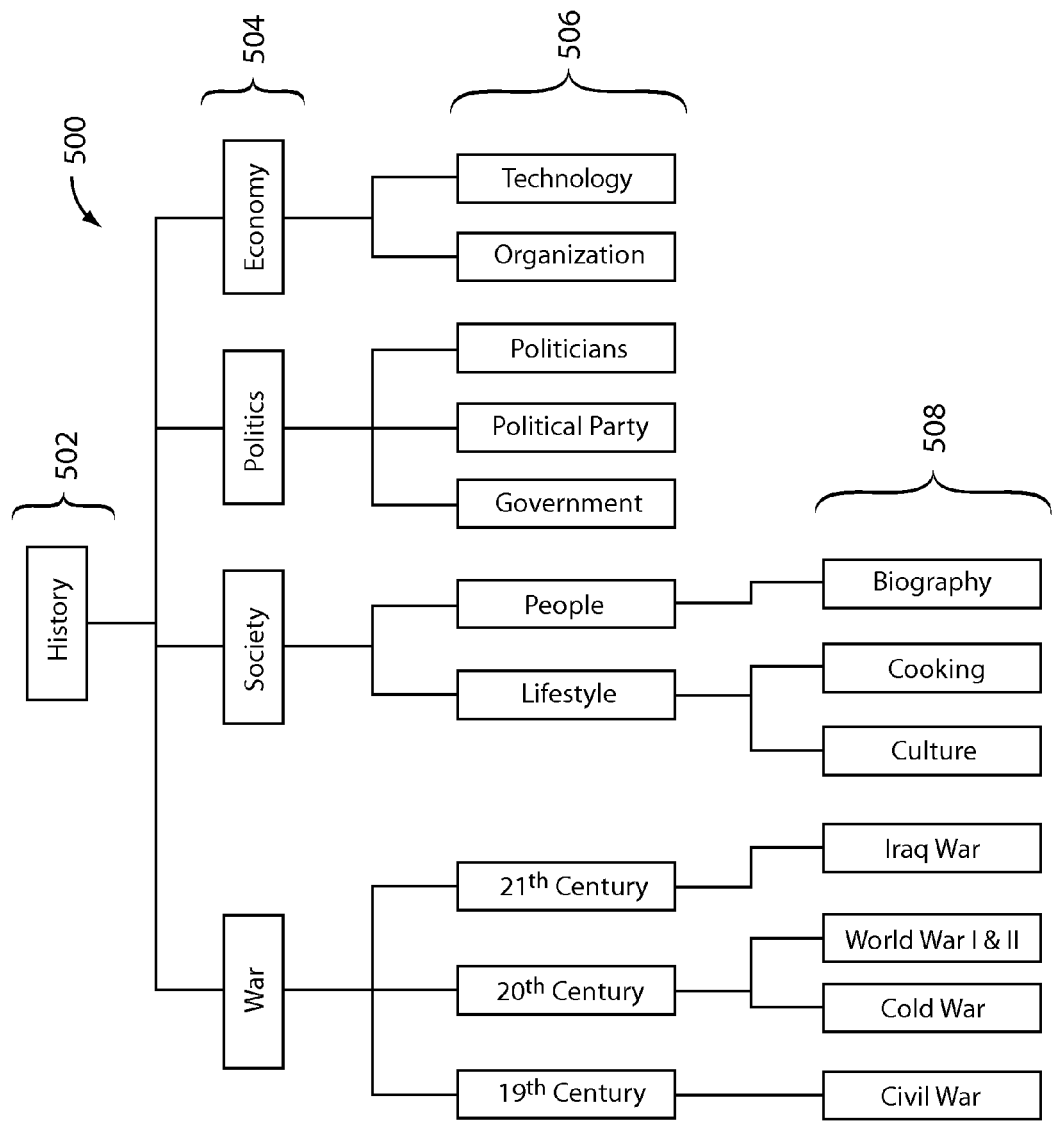
FIG. 5 illustrates an exemplary taxonomy of topics built according to an embodiment of the present invention.

FIG. 5 illustrates a taxonomy of topics 500 built using process 300 according to an embodiment of the present invention. Taxonomy 500 includes a topic node 500, children nodes 504, grandchildren nodes 506, great-grandchildren nodes 508. These nodes are stored in the TaxonomyDB in file storage subsystem 210 in one embodiment of the present invention. Each node in taxonomy 500 is a topic although in it may be a parent, child, or grandchild with respect to another node. Accordingly, a sub-topic or sub-sub-topic may be referred to as a topic for nomenclature convenience hereinafter.

In one embodiment, Taxonomy 500 is updated periodically by performing process 300 so that the taxonomy built remains current and relevant over time. Process 300 may be programmed to run automatically at a given interval, e.g., once a month, or launched upon a user initiation.

Figure 6:
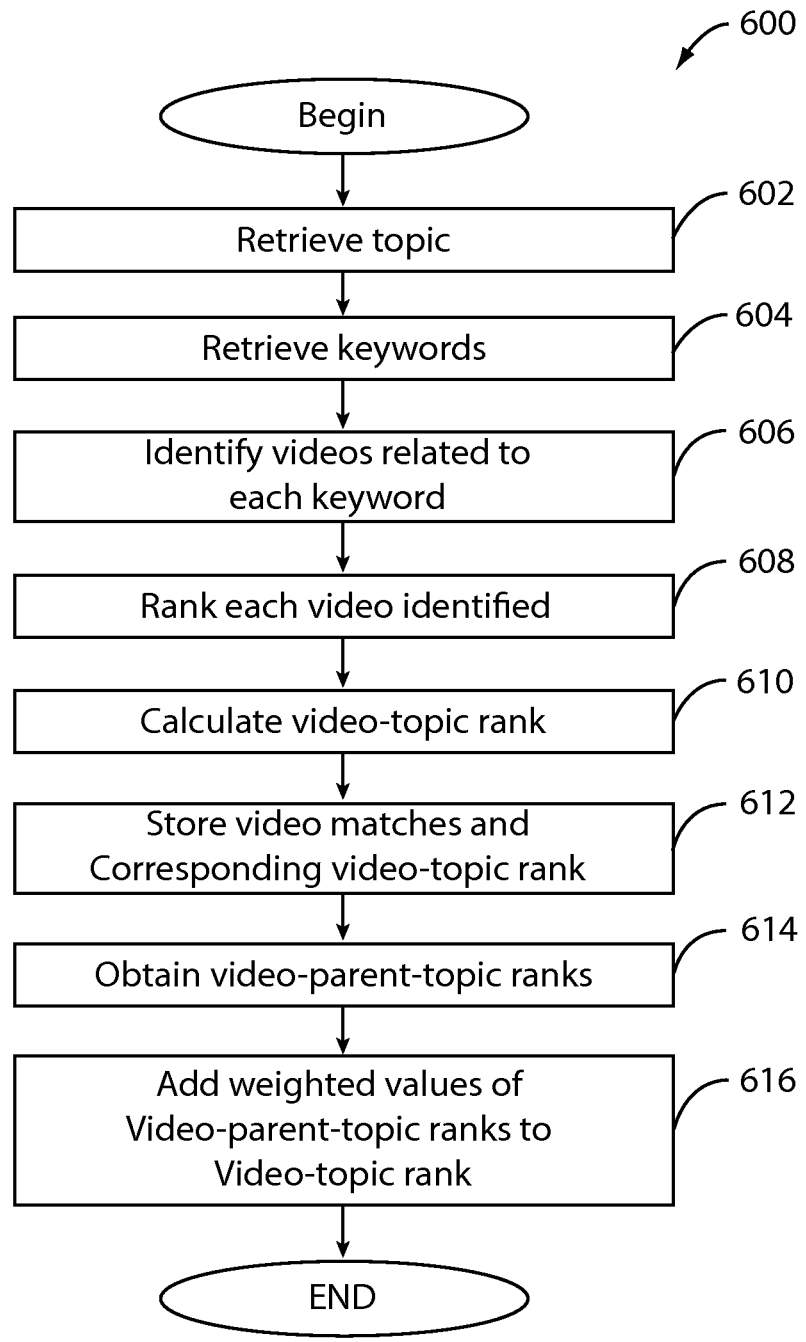
FIG. 6 is a simplified flowchart showing a method of categorizing videos based on a taxonomy of topics according to an embodiment of the present invention.

FIG. 6 illustrates a process 600 for categorizing videos based on a taxonomy of topics using video categorizer module 106 according to an embodiment of the present invention. Video categorizer module 106 may be software, firmware, or other logic components performing process 600. As will be understood by one skilled in art, certain steps described below need not be performed in the same order as described, or may be performed concurrently, or may be omitted depending on implementation.

Process 600 categorizes videos based on the hierarchical relationship between the nodes in the taxonomy and how closely the videos are related to the topic and its parent. The keywords associated with each topic node in the taxonomy are compared to the topics and the keywords associated with the videos. In one embodiment, the number of keywords that is associated with both a topic node and a video is used to decide whether or not a video should be mapped to and thereby categorized by the topic node. For illustrative purposes, process 600 is described below using a taxonomy of topics, e.g., taxonomy 500, created by taxonomy builder module 104. As will be understood by one skilled in art, process 600 is more flexible in its usage and may be used with a taxonomy created using other means.

At step 602, the topics in taxonomy 500 that are stored in the TaxonomyDB are retrieved. The retrieved topics, e.g., "history, war, society, politics, economy, $19^{th}$ century . . . biography," are temporarily stored in the "topicList" in file storage subsystem 210. Each of the topics is processed top-down so that the parent topic is processed before the child topics.

At step 604, the keywords and the ranks assigned to the keywords for a topic "T" selected are retrieved from the TaxonomyDB. The topic selected has "n" number of keywords. For each keyword for "T", videos that are associated with the same keyword are identified (step 606). In one embodiment, these videos are identified by searching the VideoDB stored in file storage subsystem 210 and/or other database. The VideoDB is built using metadata enricher module 102 according to the method described in application Ser. No. 12/340,277, entitled, "Semantic Metadata Creation for Videos," which was previously incorporated by reference.

For each video identified, a video-keyword rank is calculated (step 608). The factors considered include: (1) the rank of the topic keyword assigned by taxonomy builder 104 and (2) the total number of times the keyword appears in the video metadata. In one embodiment, the type of metadata (e.g., title, description, comments, tags, etc.) where the keyword appears in is considered as well. A higher rank is given if the keyword appears in what is deemed to be a more reliable metadata, e.g., the title of the video or the description of the video. A lower rank is given if the keyword appears in what is deemed to be less reliable metadata, e.g., the user comments or the closed captions.

After all identified videos are processed, the sum of the video-keyword ranks for all the videos that match all the keywords for topic "T" is calculated (step 610). In one embodiment, equation below is used:

$$vtRank_0(V, T) = \sum_{i=1}^{n} vkRank(V, K_i(T))$$

where, $vtRank_0(V, T)$ is a video-topic rank for video "V" and topic "T"; $vkRank(V, K_i(T))$ is a video-keyword rank for video "V" and keyword $K_i$ of topic "T"; n is the total number of keywords related to topic "T." As will be understood by one skilled in art, the equation above is provided for illustrative purposes only and other equations may be used in other embodiments.

The video matches for topic "T" and the video-topic ranks calculated at step 610 are stored in a database, "VideoTopicRankDB," in file storage subsystem 210 (step 612).

At step 614, all parent topics and other higher concept topics for "T" are retrieved if any exists. The retrieved topics include all parents, grandparents, great-grandparents, etc. of the topic in question. These higher concept topics may be collectively referred to as "parent topics" hereinafter. Among the videos related to the topic "T," the videos that are also related to its parent topics are identified and retrieved along with their video-parent-topic ranks.

A weight for the video-parent-topic rank for each parent topic "PT" is calculated based on the distance between the topic "T" and the parent topic "PT" (step 616). For example, if a parent topic "PT" is a parent of "T," the distance between them is defined to be 1, and if a parent topic "PT" is a grandparent of "T," the distance between them is defined to be 2. In one embodiment, the equation below is used for calculating the weight for the video-parent-topic rank.

$$vtRank(V, T) = \sum_{i=1}^{n} (vtRank(V, PT_i, (T) * 1/D(T, PT_i(T)) + vtRank_0(V, T)$$

where, $vtRank_0(V, T)$ is a video-topic rank for video "V" and topic "T" calculated above; $vtRank(V, PT_i(T))$ is a video-parent-topic rank for the video "V" and $PT_i(T)$, a parent topic of T; $D(T, PT_i(T)$ is the distance between topic "T" and the parent topic "$PT_i(T)$"; n is the total number of parent topics for topic "T."

Upon completing process 600, the VideoTopicRankDB contains data on the topic matches for the videos processed. A rank for each video-topic match is also stored in the VideoTopicRankDB. Alternatively, the information generated using process 600 may be stored in non-database format and may be stored in text file, hash table, or the like.

Figure 7:
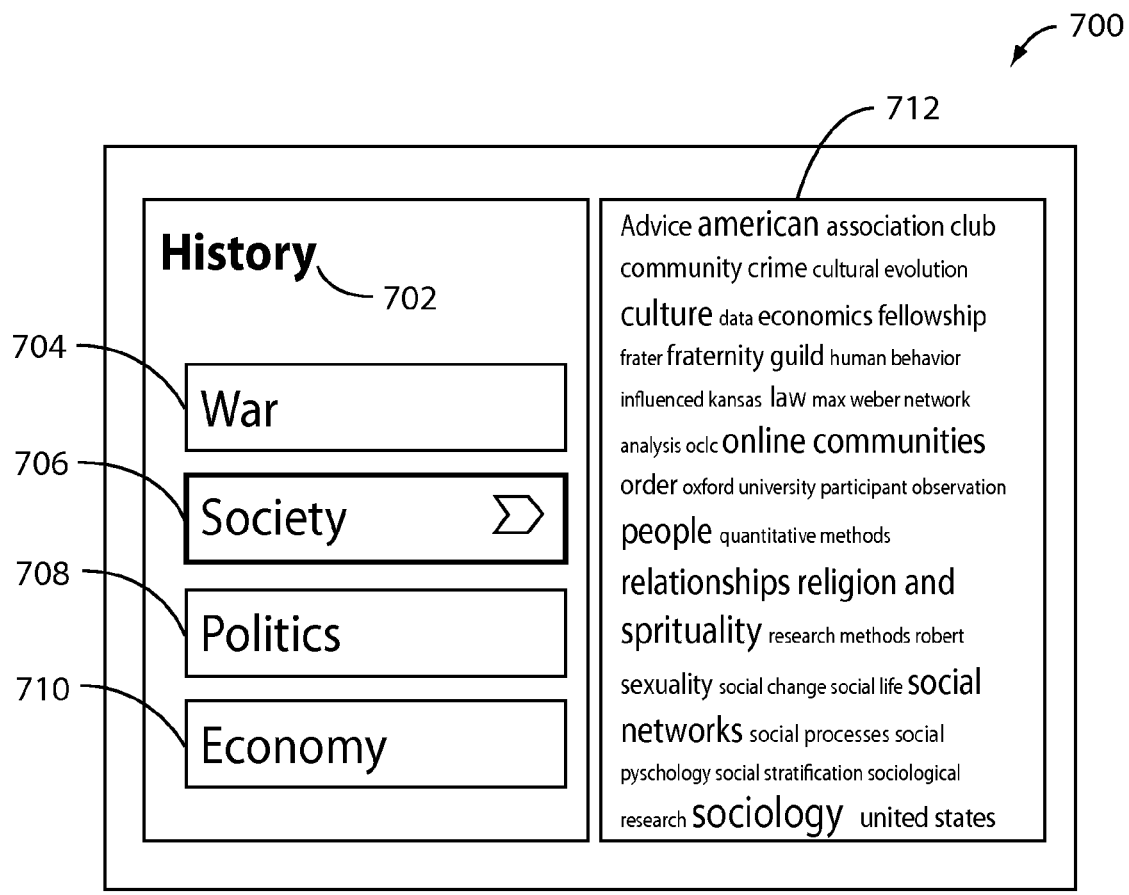
FIG. 7 illustrates a pane for a topic in a taxonomy according to an embodiment of the present invention.

FIG. 7 illustrates a pane 700 for a topic in a taxonomy according to an embodiment of the present invention. Topic pane 700 is generated by user interface module 108 to assist the end user to search and view the desired videos. User interface module 108 may be software, firmware, or other logic components. User interface module 108 builds topic pane 700 using the TaxonomyDB built by taxonomy builder module 104 and the VideoTopicRankDB built by video categorizer module 106.

Topic pane 700 includes a topic indicator 702, a first child topic 704, a second child topic 706, a third child topic 708, and a fourth child topic 710. Topic indicator 702 shows "history" as a topic selected. The child topics of "history" are "war, society, politics, and economy." See taxonomy 500 in FIG. 5. A keyword list 712 is provide adjacent to the child topics and displays the keywords related to the child topic highlighted by a user. For example, if a user selects second child topic 706 (or "society"), the keywords associated with "society" are displayed in keyword list 712. These keywords are those collected and ranked using process 300. The keywords are displayed in a larger font in their surrounding texts. In one embodiment, the keywords having a higher rank are displayed in bigger fonts than those with a lower rank. Alternatively, the rank of a keyword may be depicted using different colors or grayscales.

Figure 8:
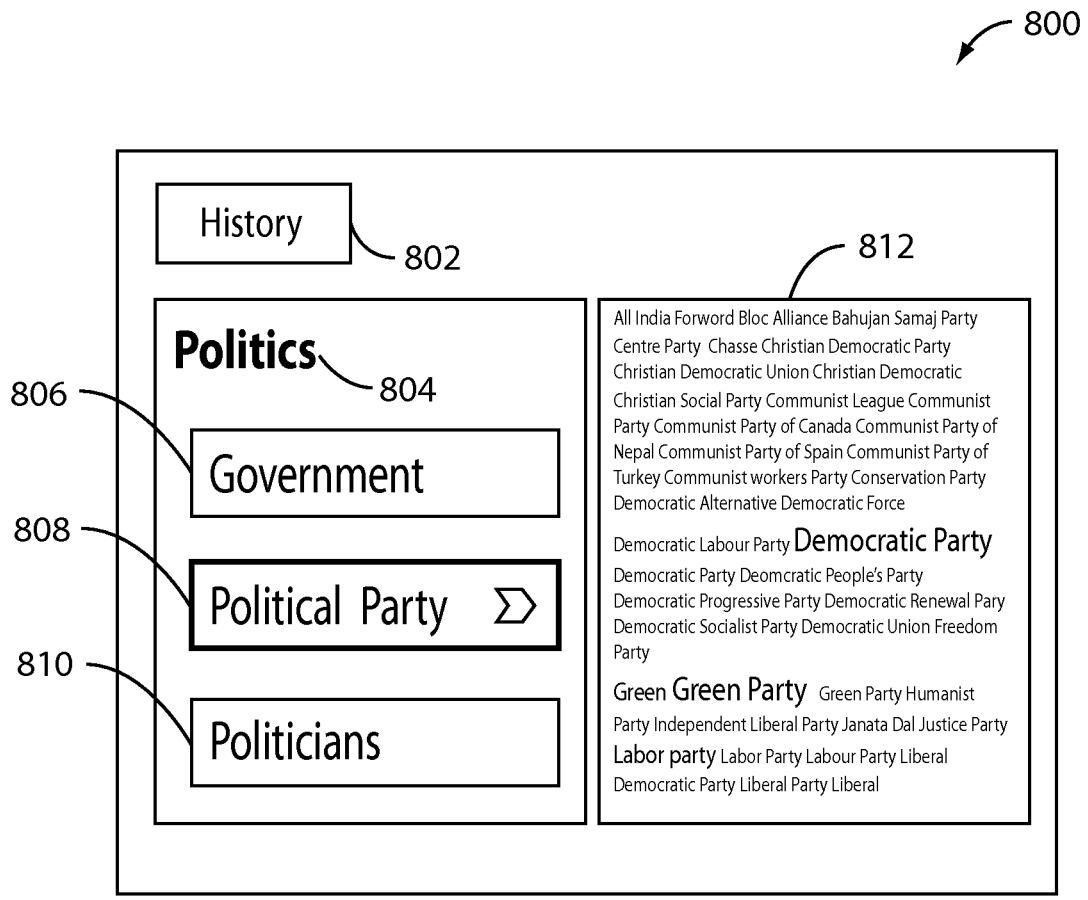
FIG. 8 illustrates a pane for a child topic in a taxonomy according to an embodiment of the present invention.

FIG. 8 illustrates a pane 800 for a child topic in a taxonomy according to an embodiment of the present invention. Child topic pane 800 for "politics" is displayed if the user selects third child topic 708 in topic pane 700. Child topic pane 800 includes a topic indictor 802, a child topic indicator 804, a first grandchild topic 806, a second grandchild topic 808, and a third grandchild topic 810. A keyword list 812 is provided adjacent to the grandchild topics and displays the keywords related to the grandchild topic highlighted by a user. For example, if a user highlights second grandchild topic 808 (or "political party"), the keywords associated with "political party" are displayed in keyword list 812. Upon reviewing the keywords associated with the highlighted child topic, the user can decide whether to view the videos related to the highlighted child topic or to highlight another child topic.

Figure 9:
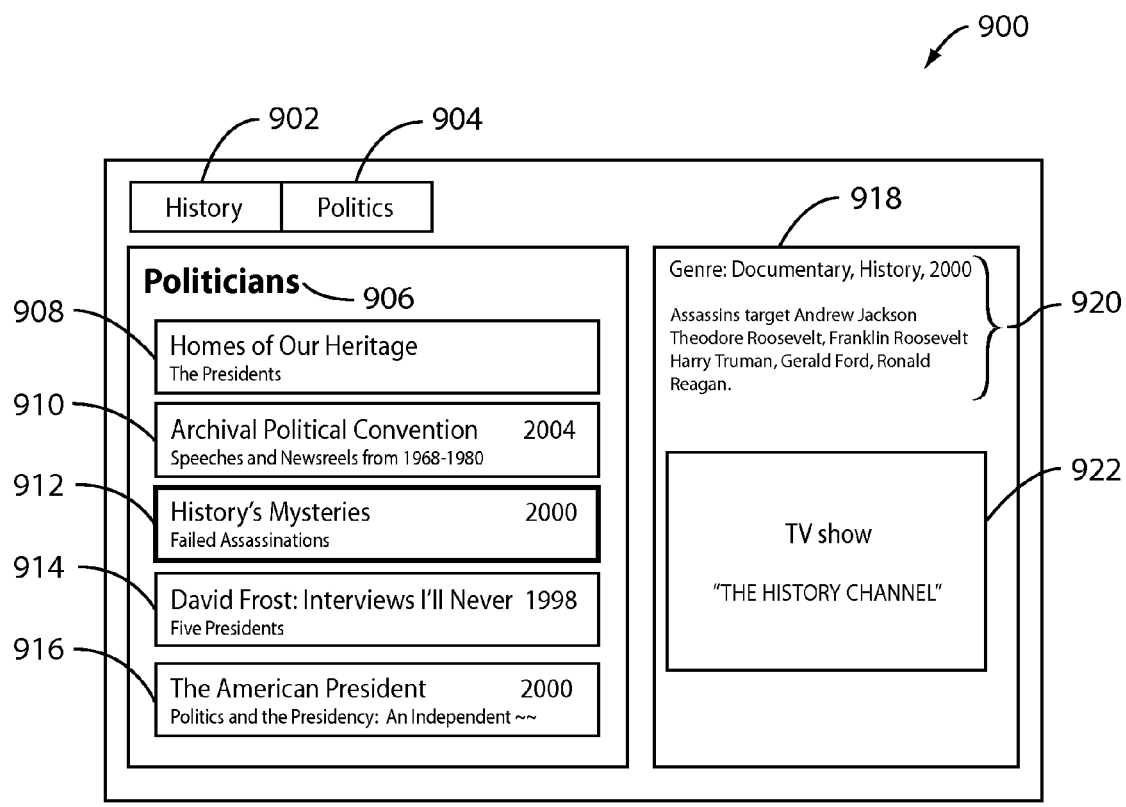
FIG. 9 illustrates a pane for videos related to a grandchild topic in a taxonomy according to an embodiment of the present invention.

FIG. 9 illustrates a pane 900 for videos related to a grandchild topic in a taxonomy according to an embodiment of the present invention. Grandchild topic pane 900 includes a topic indicator 902, a child topic indicator 904, and a grandchild topic indicator 906. In one embodiment, grandchild topic pane 900 is displayed if a user selects one of the grandchild topics in the child topic pane by clicking it. Grandchild topic pane 900 displays videos related to the selected grandchild topic "politicians." A plurality of videos 908, 910, 912, 914, and 916 related to "politicians" is displayed. These videos include those categorized by process 600. Videos are displayed according to their ranks in relation to "politicians," e.g., "Homes of Our Heritage," has a higher rank than "Archival Political Convention." The user may sort the videos displayed in other ways, e.g., by the alphabetical order of the title or the date of the video release.

A video preview pane 918 enables the user to preview a video by highlighting one of videos 908, 910, 912, 914, and 916. If the user highlights the video entitled, "History's Mysteries," a video information area 920 provides its genre, the date of release, and a description of the video. A video display area 922 displays a representative image of the video. Alternatively, the display area may show the streaming of the video. Based on the information provided in video preview pane 918, the user can decide to select the video highlighted for viewing or choose another video to preview. If the video is selected for viewing, the entire display area is filled with the video selected.

As illustrated above, video management system 100 builds a taxonomy of topics and categorizes videos based on the taxonomy built to enable end users to easily navigate through an ever increasing volume of video contents. The convenience provided to the user is significant. The taxonomy is built with minimal input from the user and easily updated and personalized. The video categorization using hierarchy of topics enables the identification of most relevant videos for a given topic.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

The foregoing description of the preferred embodiments is provided to enable a person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A computer-implemented method for managing video contents in a computer system, the method comprising:
    generating a customized taxonomy of topics personalized for a user, based on a viewing history of the user, the customized taxonomy of topics including at least one hierarchical level of sub-topics from dynamic data sources, wherein generating the customized taxonomy of topics comprises:
        collecting a plurality of keywords related to a first video topic, wherein the keywords are collected from a plurality of dynamic data sources; and
        utilizing a taxonomy builder for:
            identifying one or more video sub-topics of the first video topic based on a ranking of the keywords collected for the first video topic; and
            building a topic node in the customized taxonomy of topics, wherein the topic node includes a set comprising:
                a topic identifier for the first video topic;
                a child topic identifier comprising a list of the video sub-topics identified; and
                a keyword section comprising the keywords collected for the first video topic; and
        categorizing and ranking a plurality of videos by identifying keywords in video metadata associated with the plurality of videos, and using the hierarchical relationship in the customized taxonomy of topics to determine how closely the plurality of videos are related to the first video topic and the video sub-topics by comparing the keywords identified in the video metadata associated with the plurality of videos to the keyword section.

2. The computer-implemented method of claim 1, wherein the categorizing and ranking of the plurality of videos comprises:
    for each identified video in the plurality of videos, generating a video-keyword rank by ranking topic keywords of the taxonomy to keywords in video metadata associated with individual videos; and
    determining a video topic rank for videos in the plurality of videos having keywords for a particular topic.

3. The computer-implemented method of claim 2 further comprising adding a weighted value of the video parent-topic rank to a respective topic.

4. The computer-implemented method of claim 3, wherein:
    said plurality of keywords are collected from a plurality of dynamic data sources including a website providing reference information and a personalized data source associated with use of a personal computing device, wherein keywords collected from the personalized data source include video metadata information associated with a viewing history of video content accessed by the personal computing device, and wherein keywords collected from the website include keywords extracted from content available on the website related to first video topic; and
    a keyword appearing in only one dynamic data source is assigned to a first set to be removed during filtering.

5. The computer-implemented method of claim 4, wherein the keywords are assigned with the ranks by using one or more the following factors: the number of times a keyword appears in each dynamic data source, the total number of times a keyword appears in the dynamic data sources, and the number of times a keyword appears in a user's personalized data source.

6. The computer-implemented method of claim 4, wherein a higher ranking is given to a keyword that appears in both the personalized data source and at least one of the web sources.

7. The computer-implemented method of claim 2, further comprising:
    weighting video metadata for each video based on at least one of: reliability of different respective portions of video metadata in which a keyword appears in the video metadata and the total number of times a keyword appears in the video metadata.

8. The computer-implemented method of claim 1, further comprising performing video metadata enrichment by generating semantic tags from raw video metadata and using the semantic tags for categorizing and ranking videos.

9. The computer-implemented method of claim 1, further comprising:
    assigning a rank to each of the keyword collected based on the keyword's relevancy to the first topic, wherein the sub-topics are identified from the keywords by using the ranks assigned to the keywords;
    wherein the set comprises a tuple that includes the topic identifier for the topic node, the child topic identifier for the topic node, and the keyword section for the topic node.

10. The computer-implemented method of claim 1, further comprising:
    selecting one of the sub-topics identified;
    collecting a plurality of keywords related to the sub-topic selected, the keywords being collected using at least one dynamic data source;
    identifying one or more sub-topics of the sub-topic selected using the keywords collected; and
    building a sub-topic node in the taxonomy of topics, the sub-topic node including a subtopic identifier for the sub-topic selected, a child node identifier for the sub-topic of the sub-topic selected, and a keyword section for one or more of the keywords collected for the sub-topic selected, wherein the collecting, identifying, and building steps are repeated to build a customized taxonomy of topics having a plurality of nodes in a hierarchical structure.

11. The computer-implemented method of claim 10, the method further comprising:
retrieving keywords associated with a second topic and ranks assigned to the keywords from the taxonomy of topics;
identifying a plurality of videos associated with each keyword associated with the second topic; and
calculating a video-keyword rank for each video associated with each keyword based on a relevancy of the video to the keyword.

12. The computer-implemented method of claim 11, wherein the relevancy is determined based on one or more of the following factors: the rank of the keyword, and the total number of times the keyword appears in the metadata of the video.

13. The computer-implemented method of claim 11, further comprising:
calculating a video-topic rank by summing the video-keyword ranks calculated for each video that match at least one of the keywords of the second topic.

14. The computer-implemented method of claim 13, further comprising:
adding a weighted value of video-parent-topic ranks to the video-topic rank, the video-parent-topic rank being weighted based on a proximity of a parent topic to the second topic.

15. The computer readable medium of claim 14 further comprising code for obtaining at least one topic to form at least one root topic node.

16. The computer-implemented method of claim 10, further comprising:
retrieving keywords associated with a second topic and ranks assigned to the keywords from the taxonomy of topics;
identifying a plurality of videos associated with each keyword associated with the second topic;
mapping each video to each keyword associated with the second topic based on a hierarchical relationship of the taxonomy of topics; and
displaying a plurality of video associated with a topic or keyword selected by a user;
wherein personalized recommendations are provided to a user based on the user's viewing history and dynamic web reference sources; and
wherein the customized taxonomy of topics is personalized for a user of a personal computing device;
wherein the customized taxonomy of topics is specific to a history of use of the personal computing device;
wherein the personal computing device includes said taxonomy builder; and
wherein the customized taxonomy of topics is stored on the personal computing device.

17. The method of claim 1 further comprising:
obtaining at least one topic to form at least one root topic node.

18. A non-transitory computer-readable medium containing instructions for controlling a computer system to manage video contents, the computer-readable medium comprising:
code for generating a customized taxonomy of topics personalized for a user, based on a viewing history of the user, the customized taxonomy of topics including at least one hierarchical level of sub-topics from dynamic data sources, wherein the code for generating the customized taxonomy of topics comprises:
code for collecting a plurality of keywords related to a video topic, wherein the keywords are collected from a plurality of dynamic data sources; and
code for utilizing a taxonomy builder for:
identifying one or more video sub-topics of the video topic based on a ranking of the keywords collected for the video topic; and
building a topic node in the custom taxonomy of topics, wherein the topic node includes a set comprising:
a topic identifier for the video topic;
a child topic identifier comprising a list of the video sub-topics identified; and
a keyword section comprising the keywords collected for the video topic; and
code for categorizing and ranking a plurality of videos by identifying keywords in video metadata associated with the plurality of videos, and using the hierarchical relationship in the customized taxonomy of topics to determine how closely the plurality of videos are related to the first video topic and the video sub-topics by comparing the keywords identified in the video metadata associated with the plurality of videos to the keyword section.

19. The computer-readable medium of claim 18, wherein:
the at least one dynamic data sources to collect the keywords comprises a plurality of web sources;
personalized recommendations are provided to a user based on the user's viewing history and dynamic web reference sources;
the customized taxonomy of topics is personalized for a user of a personal computing device;
the customized taxonomy of topics is specific to a history of use of the personal computing device;
the personal computing device includes said taxonomy builder; and
the customized taxonomy of topics is stored on the personal computing device.

20. The computer-readable medium of claim 18, further comprising:
code for filtering the keywords collected to remove a first set of the keywords that are deemed to be less relevant to the first topic than a second set of the keywords and using the filtered keywords to perform the ranking used to determine sub-topics.

21. The computer-readable medium of claim 20, further comprising:
code for assigning a rank to each of the keywords collected that is in the second set.

22. The computer-readable medium of claim 21, wherein a keyword assigned with a rank that is less than a threshold value is removed from the keywords collected to obtain a third set of the keywords, wherein the keywords listed in the keyword section of the topic node are the keywords belonging to the third set.

23. The computer-readable medium of claim 20, wherein:
said plurality of keywords are collected from a plurality of dynamic data sources including a website providing reference information and a personalized data source associated with use of a personal computing device, wherein keywords collected from the personalized data source include video metadata information associated with a viewing history of video content accessed by the personal computing device, and wherein keywords collected from the website include keywords extracted from content available on the website related to first video topic; and
a keyword appearing in only one dynamic data source is assigned to a first set to be removed during filtering.

24. The computer-readable medium of claim 18, further comprising:
   code for assigning a rank to each of the keyword collected based on the keyword's relevancy to the first topic, wherein the sub-topics are identified from the keywords by using the ranks assigned to the keywords;
   wherein the set comprises a tuple that includes the topic identifier for the topic node, the child topic identifier for the topic node, and the keyword section for the topic node.

25. A computer system for managing video contents, comprising:
   a personal electronic device including a processor configured to process information;
   a storage subsystem configured to store information and computer program code;
   the computer system configured for:
      generating a custom taxonomy of topics personalized for a user, based on a viewing history of the user, the custom taxonomy of topics including at least one hierarchical level of subtopics from dynamic data sources, wherein generating the custom taxonomy of topics comprises:
         collecting a plurality of keywords related to a video topic, wherein the keywords are collected from a plurality of dynamic data sources; and
         utilizing a taxonomy builder for:
            identifying one or more video sub-topics of the video topic based on a ranking of the keywords collected for the video topic; and
            building a topic node in the custom taxonomy of topics, wherein the topic node includes a set comprising:
               a topic identifier for the video topic;
               a child topic identifier comprising a list of the video sub-topics identified; and
               a keyword section comprising the keywords collected for the video topic; and
      categorizing and ranking a plurality of videos by identifying keywords in video metadata associated with the plurality of videos, and using the hierarchical relationship in the customized taxonomy of topics to determine how closely the plurality of videos are related to the first video topic and the video sub-topics by comparing the keywords identified in the video metadata associated with the plurality of videos to the keyword section.

26. The computer system of claim 25, wherein:
   the at least one dynamic data source comprises a plurality of web sources;
   personalized recommendations are provided to a user based on the user's viewing history and dynamic web reference sources;
   the custom taxonomy of topics is personalized for a user of the personal electronic device;
   the custom taxonomy of topics is specific to a history of use of the personal electronic device;
   the personal electronic device includes said taxonomy builder; and
   the custom taxonomy of topics is stored on the personal electronic device.

27. The computer system of claim 25, further comprising:
   the computer system configured for filtering the keywords collected to remove a first set of the keywords that are deemed to be less relevant to the first topic than a second set of the keywords.

28. The computer system of claim 27, further comprising:
   the computer system configured for assigning a rank to each of the keywords collected that is in the second set.

29. The computer system of claim 25, further comprising:
   the computer system configured for assigning a rank to each of the keyword collected based on the keyword's relevancy to the first topic, wherein the sub-topics are identified from the keywords by using the ranks assigned to the keywords;
   wherein the set comprises a tuple that includes the topic identifier for the topic node, the child topic identifier for the topic node, and the keyword section for the topic node.

30. The computer system of claim 25, wherein the keywords are assigned with the ranks by using one or more the following factors: (i) the number of times a keyword appears in each dynamic data source, (ii) the total number of times a keyword appears in the dynamic data sources, and (iii) the number of times a keyword appears in a user's personalized data source.

31. The computer system of claim 25, wherein:
   said plurality of keywords are collected from a plurality of dynamic data sources including a website providing reference information and a personalized data source associated with use of a personal electronic device, wherein keywords collected from the personalized data source include video metadata information associated with a viewing history of video content accessed by the personal electronic device, and wherein keywords collected from the website include keywords extracted from content available on the website related to first video topic.

32. The computer system of claim 25, further comprising:
   the computer system configured for selecting one of the sub-topics identified;
   the computer system configured for collecting a plurality of keywords related to the subtopic selected, the keywords being collected using at least one dynamic data source;
   the computer system configured for identifying one or more sub-topics of the sub-topic selected using the keywords collected; and
   the computer system configured for building a sub-topic node in the custom taxonomy of topics, the sub-topic node including a sub-topic identifier for the sub-topic selected, a child node identifier for the sub-topic of the sub-topic selected, and a keyword section for one or more of the keywords collected for the sub-topic selected, wherein the collecting, identifying, and building steps are repeated to build a custom taxonomy of topics having a plurality of nodes in a hierarchical structure.

33. The computer system of 32, the method further comprising:
   the computer system configured for retrieving keywords associated with a second topic and ranks assigned to the keywords from the taxonomy of topics;
   the computer system configured for identifying a plurality of videos associated with each keyword associated with the second topic; and
   the computer system configured for calculating a video-keyword rank for each video associated with each keyword based on a relevancy of the video to the keyword.

34. The computer system of claim 33, wherein the relevancy is determined based on one or more of the following factors: (i) the rank of the keyword, and (ii) the total number of times the keyword appears in the metadata of the video.

35. The computer system of claim 33, further comprising:
the computer system configured for calculating a video-topic rank by summing the video-keyword ranks calculated for each video that match at least one of the keywords of the second topic.

36. The computer system of claim 35, further comprising:
the computer system configured for adding a weighted value of video-parent-topic ranks to the video-topic rank, the video-parent-topic rank being weighted based on a proximity of a parent topic to the second topic.

37. The computer system of claim 32, further comprising:
the computer system configured for retrieving keywords associated with a second topic and ranks assigned to the keywords from the taxonomy of topics;
the computer system configured for identifying a plurality of videos associated with each keyword associated with the second topic;
the computer system configured for mapping each video to each keyword associated with the second topic based on a hierarchical relationship of the taxonomy of topics; and
the computer system configured for displaying a plurality of video associated with a topic or keyword selected by a user.

* * * * *